Nov. 8, 1932.  B. D. FOGLE  1,887,405
AUTOMOBILE DEVICE
Filed Jan. 26, 1931

B. D. Fogle.
INVENTOR

Victor J. Evans
ATTORNEY

WITNESS. George L. Ogle.

Patented Nov. 8, 1932

1,887,405

UNITED STATES PATENT OFFICE

BENNIE D. FOGLE, OF SPRINGFIELD, SOUTH CAROLINA

AUTOMOBILE DEVICE

Application filed January 26, 1931. Serial No. 511,425.

This invention relates to new and useful improvements in automobile devices and has for the primary object, the provision of means to facilitate the proper positioning and holding of the drive shaft bearing lock sleeve when assembling the drive shaft in the housing or tube therefor and prior to adjusting the usual bearing sleeve lock studs or bolts, consequently rendering a large saving in time and labor heretofore required for the particular operation and further permits the employment of unskilled labor to effect the assembly which heretofore required highly skilled labor and provided a large annoyance to such labor by the sleeve canting before the locking thereof could be accomplished.

Another object of this invention is the provision of an automobile device of the above stated character which will be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing in which.

Figure 1:
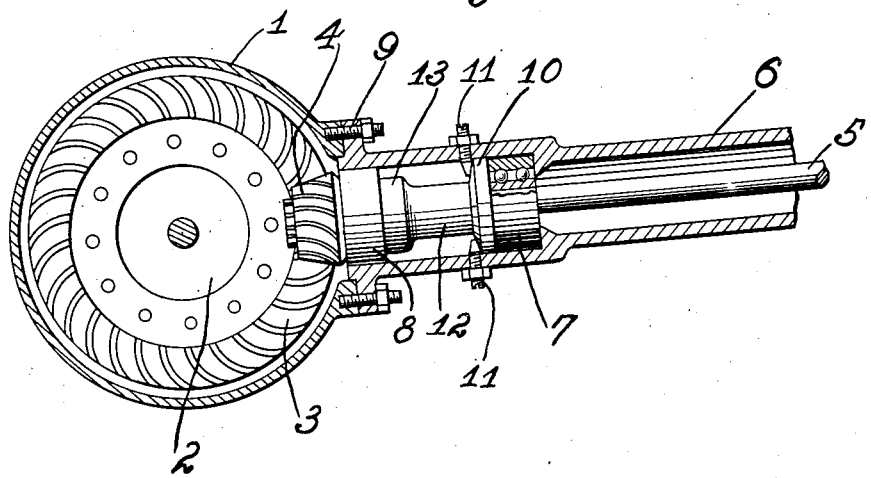
Figure 1 is a longitudinal sectional view illustrating the drive assembly of a motor vehicle with a device applied thereto and constructed in accordance with my invention.
Figure 2:
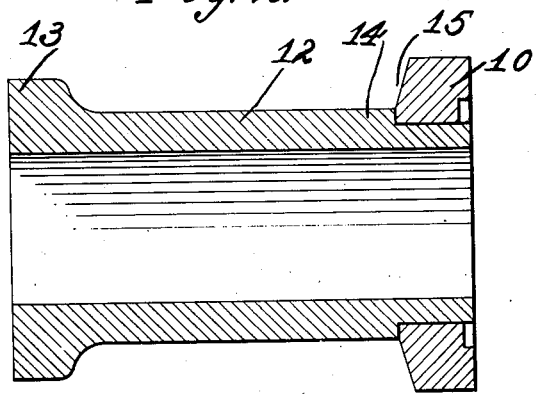
Figure 2 is a longitudinal sectional view illustrating the improvement of retaining the bearing lock sleeve in proper position prior to locking the sleeve in the housing.

Referring in detail to the drawing, the numeral 1 indicates a differential housing having a conventional type of differential 2 which includes the ring gear 3 meshing with the drive pinion 4 secured to the rear end of the drive shaft 5. The drive shaft 5 is mounted in the housing or tube 6 by front and back bearings 7 and 8. The rear end of the tube or housing 6 is bolted to the differential housing 1 in the usual way by the stud bolts 9. The front bearing 7 is retained in proper position within the tube 6 by a bearing lock sleeve 10 engaged by set bolts 11 carried by the tube or housing as clearly shown in Figure 1. The foregoing description relates to a well known type for construction of rear drive assembly for motor vehicles and to which my invention is applied.

When assembling the bearings and drive shaft within the tube or housing 6 prior to applying to the differential housing 1, it has been found difficult to retain the lock sleeve 10 in proper position before turning the set bolts 11 in engagement therewith and to prevent canting of the bearing lock sleeve 10, my invention is provided.

To retain the bearings 7 and 8 properly spaced when assembling or when in use, a tubular spacer 12 is mounted on the drive shaft 5 between the bearing 8 and the bearing 7 and has one end enlarged to form a bearing shoulder 13 contacting with the bearing 8 while the opposite end of the member 12 is reduced to form a bearing surface on which the bearing lock sleeve 10 is journaled and held against endwise movement in one direction by the shoulder 14 formed by reducing the end of the member 12. With the member 12 positioned on the drive shaft 5 between the bearings 7 and 8 and with the bearing lock sleeve 10 mounted thereon, the bearing lock sleeve 10 is prevented from canting or moving out of proper position during the assembly of the drive shaft 5 in the tube 6 and also prior to turning the set bolts 11 into engagement with the bevel face 15 of the bearing lock sleeve consequently permitting a person to easily and quickly assemble the device and further permit the employment of unskilled labor if desired. Without some means of holding the bearing lock sleeve in proper position when assembling the device and prior to turning the set bolts 11 in engagement therewith, the sleeve 10 will become disarranged or canted consequently providing annoyance and a large expenditure of labor in order to properly position the sleeve 10 to turn the bolts 11 in engagement therewith, therefore it will be seen that I have provided a device capable of performing a very efficient function with a large saving of time and labor.

While I have shown and described the preferred embodiment of my invention, it will be understood that minor changes in construction, combination and arrangement of parts may be made without departing from the spirit and scope of the invention as claimed.

Having thus described my invention, what I claim is:

1. An automobile device comprising a spacing member to be positioned on the drive shaft between front and rear bearings therefor to retain a bearing lock sleeve of one of said bearings from canting during the assembling of the drive shaft and its bearings in the drive shaft housing and prior to securing the bearing lock sleeve in place.

2. An automobile device comprising a tubular member positioned on a drive shaft between the bearings therefore and having a reduced portion providing an annular shoulder to be engaged by a bearing lock sleeve of one of said bearings to prevent said sleeve from canting during the assembling of the drive shaft in the housing therefor.

3. An automobile device comprising a spacing member to be positioned on the drive shaft between front and rear bearings therefor to retain a bearing lock sleeve of one of said bearings from canting during the assembling of the drive shaft and its bearings in a drive shaft housing and prior to securing the bearing lock sleeve in place, said sleeve having one end enlarged to engage one of the bearings and its opposite end reduced to provide a journal for the bearing lock sleeve.

In testimony whereof I affix my signature.

BENNIE D. FOGLE.